3,003,263
DITCHER
Alvin L. Meyer, Jr., and Roy Dee Meyer, Fairfield, Mont.
Filed Mar. 23, 1961, Ser. No. 97,791
6 Claims. (Cl. 37—98)

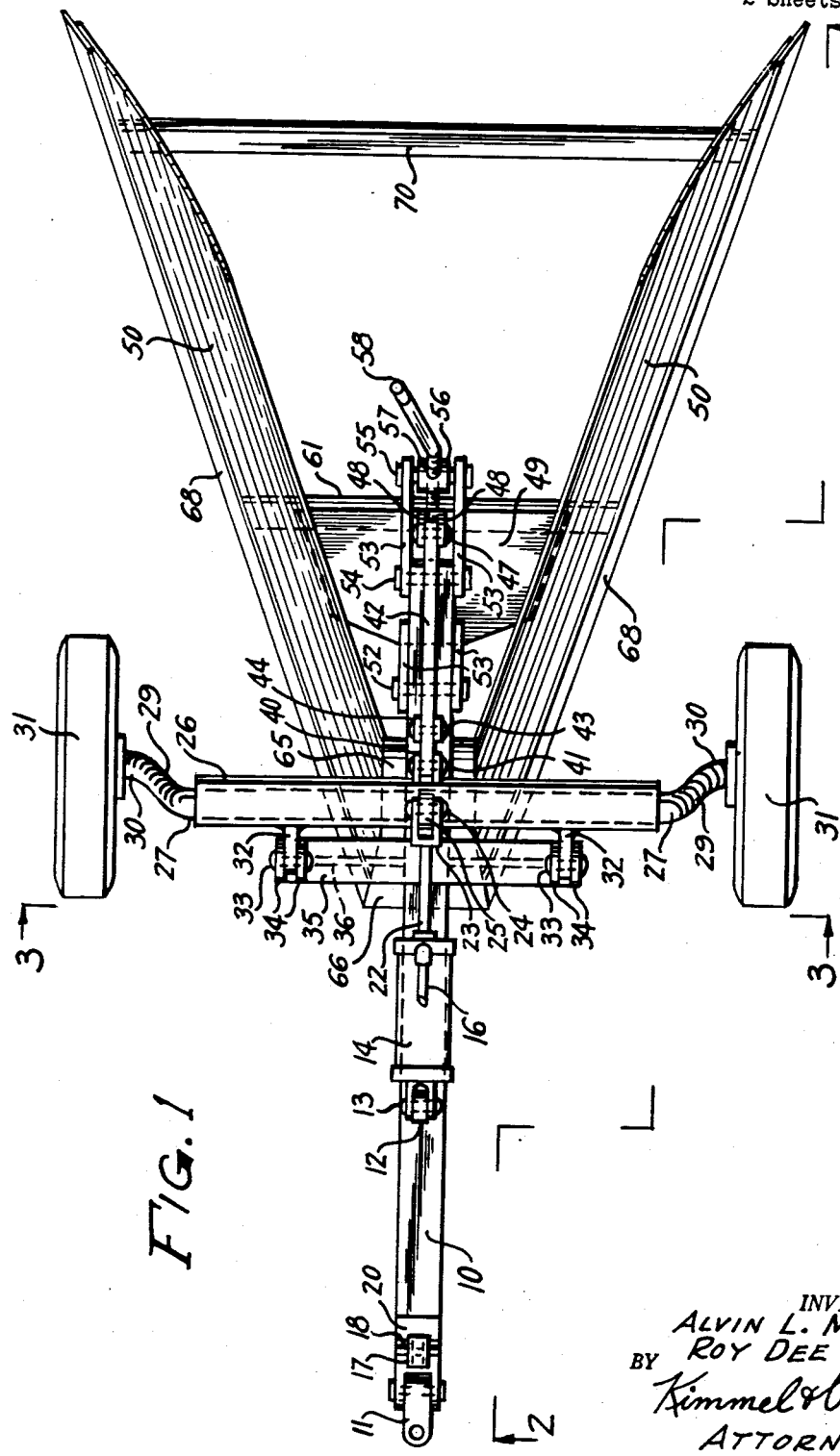

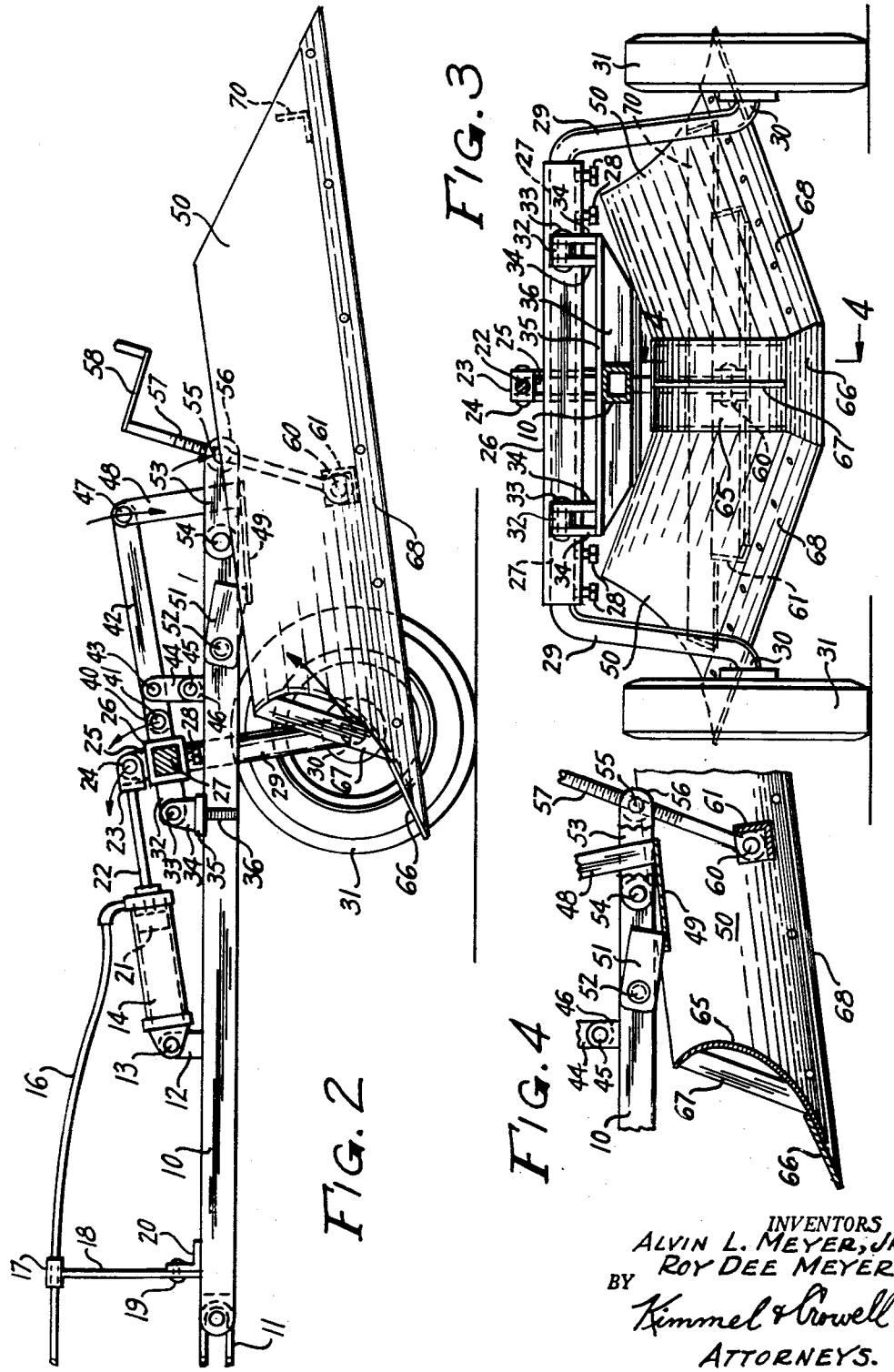

This invention relates to a ditcher or ditch digging device of the same general type as those shown in our prior United States Patents 2,188,892, 2,673,408, and 2,839,847, and constitutes an improvement over the devices of these prior patents.

A primary object of the invention is the provision of a ditcher of this character provided with a leveling bar and a pivoting hitch in association with a pivoting axle and offset wheel assemblies so that as the point is lowered the leveling bar raises the ditching point to keep the ditch the same width, thus making it possible to dig relatively deep ditches without increasing the width thereof.

An additional object of the invention is the provision of a control means for varying the effective operating width of the ditcher point so as to provide a wide range in variations of ditch size.

Still another object of the invention resides in the provision of a replaceable cutting edge for the ditcher, and replaceable and reversible beveled edge cutter blades.

A still further object of the invention resides in the provision of a flat nose with a tapered point comprising a digging point for providing a flat bottom ditch, and the provision of a dividing knife in front of the ditching V.

Still another object of the invention is the provision of such a ditcher having adjustable wheels so that the width of the ditch may be increased, with the wheels straddling the ditch.

A still further object of the invention is the provision of such a ditcher which is extremely sturdy and durable in construction enabling its use with a powerful towing vehicle such as a tractor or the like.

Still other objects reside in the combinations of elements, arrangements of parts, and features of construction, all as will be more fully pointed out hereinafter and disclosed in the accompanying drawing wherein:

FIGURE 1 is a top plan view of one form of ditcher constructed in accordance with the instant invention.

FIGURE 2 is a side view partially in elevation and partially in section taken substantially along the line 2—2 of FIGURE 1 as viewed in the direction indicated by the arrows.

FIGURE 3 is a sectional view taken substantially along the line 3—3 of FIG. 1 as viewed in the direction indicated by the arrows; and FIGURE 4 is a sectional view taken substantially along the line 4—4 of FIG. 3 as viewed in the direction indicated by the arrows.

Similar reference characters refer to similar parts throughout the several views of the drawing.

Having reference now to the drawings in detail, the ditcher of the instant invention comprises a main longitudinally extending frame bar 10 provided with tractor hitch means 11 at one end, the frame bar carrying at an intermediate point a vertical lug 12 to which is pivotally secured as by a pivot 13 a hydraulic cylinder 14. Cylinder 14 is supplied with hydraulic fluid through a line 16 which is supported in a tubular support 17 carried by an upright 18 which is pivoted as on a pivot 19 to a bracket 20 secured to frame member 10 adjacent the tractor hitch 11.

Cylinder 14 carries a piston 21 having a piston rod 22 secured thereto, piston rod 22 carrying a clevis 23 at its free end which is pivotally secured as by means of a pivot 24 to a lug 25 carried by a horizontally extending axle support 26.

Axle support 26 is open at each end and has positioned therein axle members 27 which are linearly slidable and are secured in position by means of set screws 28, each axle 27 terminating at an offset portion 29 which in turn terminates in a stub axle 30, each stub axle 30 having mounted thereon a wheel 31, preferably of the rubber tired variety.

A pair of horizontal lugs 32 extend from a side portion of axle support member 26 and are pivotally secured as by means of pivots 33 between lugs 34 which are carried by a transverse bar 35, the bar 35 being fixedly secured to frame member 10, and comprising a T bar, the vertical stem of which is indicated at 36.

A pair of spaced lugs 40 are centrally carried by the side of axle housing 26 opposite lugs 32 and are pivotally connected as by means of a pivot 41 to one end of a link 42. Link 42 is pivotally connected at an intermediate point by means of a pivot 43 to a vertically positioned link 44 which is pivoted as by means of a pivot 45 at its other end to a pair of lugs 46 carried by frame member 10.

The opposite end of link 42 is pivoted as by means of a pivot 47 to a vertical member 48 which is secured to a transverse plate 49, which extends between the tops of the side boards 50 of the plow member to be more fully described hereinafter. Plate 49 is secured at its forward end to a pair of plates 51 which are pivoted as by means of a pivot 52 to frame member 10.

Links 53 are pivotally connected as by means of a pivot 54 to the end of frame member 10, and are pivotally connected at their other end by means of a pivot 55 to an adjusting block 56, which is provided with an interiorly threaded bore. The bore 56 accommodates a screw member 57 which is provided with an operating handle 58 for rotating the same, and which is connected at its lower end by means of a ball and socket connection 60 to a transverse angle iron 61 which extends between the mold boards 50 of the plow.

The mold boards 50 converge to a plow point 65 which, as best shown in FIGURE 4, is concaved rearwardly, and which is provided with a replaceable cutting edge or spade 66. The spade 66 is of straight line frontal configuration, and is adapted to provide a flat bottomed ditch. A divider blade 67 extends centrally across the concavity of ditch point 65, and serves to split the sod and divide dirt as the ditch is dug. Replaceable beveled edge cutting blades 68 are also provided along the lower edges of the mold boards 50.

A reinforcing angle iron 70 extends between the mold boards adjacent the rear or divergent ends thereof.

From the foregoing the use and operation of the device should now be readily understandable. Assuming that the parts are in the position of FIGURE 2 with the wheels 31 in contact with the ground, when the device is in a position for towing, when it is desired to employ the ditcher, hydraulic fluid is fed through the line 16 into the cylinder 14, this being controlled in a desired conventional manner, which serves to retract the piston rod 22, and cause the axle housing 26 and its associated offset axles and wheels to rise, the assembly rotating about the pivots 33. Simultaneously with this action, the plow point 66 sinks into digging position, the angle of inclination of the plow remaining the same due to the linkage effected by the link 42 and the link 44 and the pivotal mounting of the end of link 42 on pivots 41 and 47.

The angle of inclination of the plow point may be readily varied by rotation of the handle 57 and in accordance with the angle, and the divergence of the mold boards 50 and their associated cutting edges 68 the width of the ditch may similarly be varied so that a relatively narrow or alternatively, a relatively wide ditch may be dug in accordance with the angle of inclination of the plow point assembly.

The replaceable point 66 and edges 68 insure long life for the apparatus, since the greatest wear on the assembly is effected at these points. Similarly, the adjustment of the wheels 31 by means of the set screws 28 and the axles 27 in tubular axle support 26 renders the device effective with any desired width of ditch within relatively wide limits.

It will thus be seen that there is herein provided an improved ditcher which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

We claim:

1. A ditcher comprising, in combination, a main frame bar, an axle support extending transversely across said bar, offset axles carried by said axle support, wheels carried by said offset axles, pivot means connecting said axle support to said frame bar, lift means for rotating said axle support about said pivot means, a link comprising a leveling bar pivotally connected to said axle support on the side opposite said pivot means, a lift arm pivoted to the other end of said link, a ditching plow secured to said lift arm, side plates pivoted to said frame member intermediately of said link, and means securing said ditch plow to said plates for raising and lowering said plow and said wheels relative to each other while maintaining the plow at a constant angle.

2. A ditcher comprising, in combination, a main frame bar, an axle support extending transversely across said bar, offset axles carried by said axle support, wheels carried by said offset axles, pivot means connecting said axle support to said frame bar, lift means for rotating said axle support about said pivot means, a link comprising a leveling bar pivotally connected to said axle support on the side opposite said pivot means, a lift arm pivoted to the other end of said link, a ditching plow secured to said lift arm, side plates pivoted to said frame member intermediately of said link, means securing said ditch plow to said plates for raising and lowering said plow and said wheels relative to each other while maintaining the plow at a constant angle, adjusting plates pivoted to the end of said frame bar, an adjusting block pivotally mounted between said adjusting plates, said block having a threaded bore therethrough, an adjusting screw extended through said bore, means pivotally connecting an end of said adjusting screw to said plow, and a handle on the other end of said screw for varying the angular inclination of said plow.

3. A ditcher according to claim 2 wherein said plow has a flattened concave nose and a flat bottom tapered plow blade to provide a flat bottom ditch.

4. The structure of claim 3 wherein said nose has a replaceable edge.

5. The structure of claim 4 wherein a vertical divider plate extends vertically across the concavity of said nose.

6. The structure of claim 5 wherein said offset axles are adjustably mounted in said axle support for varying the relative width of the spacing of said wheels.

References Cited in the file of this patent

UNITED STATES PATENTS

| | | |
|---|---|---|
| 2,558,692 | Pace | June 26, 1951 |
| 2,765,609 | Oehler | Oct. 9, 1956 |

FOREIGN PATENTS

| | | |
|---|---|---|
| 466,477 | Canada | July 11, 1950 |